United States Patent [19]
Nishimura

[11] Patent Number: 5,046,099
[45] Date of Patent: Sep. 3, 1991

[54] ADAPTATION OF ACOUSTIC PROTOTYPE VECTORS IN A SPEECH RECOGNITION SYSTEM

[75] Inventor: Masafumi Nishimura, Yokohama, Japan

[73] Assignee: International Business Machines Corporation, Armonk, N.Y.

[21] Appl. No.: 485,402

[22] Filed: Feb. 27, 1990

[30] Foreign Application Priority Data

Mar. 13, 1989 [JP] Japan .................................. 1-57760

[51] Int. Cl.$^5$ .............................................. G10L 5/00
[52] U.S. Cl. .................................. 381/43; 364/513.5
[58] Field of Search ........................ 381/43; 364/513.5

[56] References Cited

U.S. PATENT DOCUMENTS 4,718,094  1/1988  Bahl et al. .............................. 381/43
4,977,599  12/1990 Bahl et al. .............................. 381/43

OTHER PUBLICATIONS

Bahl, L. R., et al. "Acoustic Markov Models Used in the Tangora Speech Recognition System", *Proc. ICASSP '88*, S11-3, pp. 497-500, Apr. 1988.
Shikano, K. "Speaker Adaptation by Vector Quantization", *Electronics and Communication Institute Technical Research Report*, SP-86-65, pp. 33-40, Dec. 1986.
Furui, S. "Speaker Adaptation Method without a Teacher Based upon Clustering of Spectrum Space", *Japanese Acoustic Institute, Proceeding of Spring National Meeting of Showa 63*, 2-2-16, Mar. 1988.
Nishimura, M. et al, "Speaker Adaptation Method for HMM-Based Speech Recognition", *Proc. ICASSP '88*, S5-7, Apr. 1988.

Primary Examiner—Emanuel S. Kemeny
Attorney, Agent, or Firm—Marc D. Schechter

[57] ABSTRACT

In a speech recognition system, the prior parameters of acoustic prototype vectors are adapted to a new speaker to obtain posterior parameters by having the speaker utter a set of adaptation words. The prior parameters of an acoustic prototype vector are adapted by a weighted sum of displacement vectors obtained from the adaptation utterances. Each displacement vector is associated with one segment of an uttered adaptation word. Each displacement vector represents the distance between the associated segment of the adaptation utterance and the model corresponding to that segment. Each displacement vector is weighted by the strength of the relationship of the acoustic prototype vector to the word segment model corresponding to the displacement vector.

9 Claims, 5 Drawing Sheets

ADAPTATION OF ACOUSTIC PROTOTYPE VECTORS IN A SPEECH RECOGNITION SYSTEM

BACKGROUND OF THE INVENTION

The present invention relates to a speech recognition system using fenonic Markov models, and particularly to such a system in which the vector quantization code book is easily and accurately adoptable.

Speech recognition using Markov models recognizes speech probabilistically. For example, in one method thereof speech is first frequency-analyzed for each of a series of time periods (called "frames") and vector quantized and then converted into a label (symbol) train. One Markov model is set for each label. On the basis of the label train registered with the speech, a Markov model train (word baseform) is given for each word.

Each Markov model has a plurality of states and transitions between the states. Each transition has a probability of occurrence. One or more labels may be output by each Markov model at each state or transition. Label output probabilities at each state or transition are assigned to the state or transition.

In the recognition process, unknown input speech is converted into a label train. The probabilities of producing this label train by the respective word Markov models specified by the word baseforms are determined based upon the foregoing transition probabilities and label output probabilities (called "parameters" hereinafter). The word Markov model having the maximum probability of producing the label train is the recognition result.

Such a Markov model for each label unit is called a "fenonic Markov model". The model made to correspond to the same label is treated as the common model at the time of the learning and recognition of the model. The details of fenonic Markov models are given in the following literature:

(1) "Acoustic Markov Models Used in the Tangora Speech Recognition System" (*Proceedings of ICASSP'88*. S11-3, L. R. Bahl, P. F. Brown, P. V. de Souza, R. L. Mercer and M. A. Picheny, pages 497-500, April 1988).

In speech recognition using the foregoing Markov model, a large amount of speech data is required for the preparation of the code book of the vector quantization, the estimation of the Markov model, and the registration of the word baseform, and much time is also required for these operations. Many systems prepared with the speech data of predetermined speakers may not give sufficient recognition accuracy for other speakers. Recognition accuracy is degraded when the environment becomes different due to the lapse of a relatively long time, even for the same speaker. There is also a problem when the recognition accuracy is degraded due to environmental noise.

In reference (1), although the learning time is greatly reduced by preparing word baseforms from predetermined speaker utterances, it still requires a large amount of speech data and much process time since the quantization code book and the parameters of the Markov model are reevaluated for each speaker.

Recently, in order to solve these problems it has been proposed that the vector quantization code book and the Markov model for the predetermined speaker be adapted to different speakers and circumstances. The adaptation methods of the vector quantization code book may be divided into the following two types.

The first is to determine the correspondence between the learning utterance and the predetermined speaker utterance by DP matching, and adapt the code book using it. This is disclosed in:

(2) "Speaker adaptation by vector quantization" (*Electronics and Communication Institute Technical Research Report*, SP-86-65, pages 33-40, by Kiyohiro Shikano, December 1986).

However, it is impossible to exactly determine the correspondence by this method when the distribution of the feature quantity changes greatly. Furthermore, it does not necessarily give the same evaluation as that on the Markov model because the correspondence is based upon the distance. It also results in degraded efficiency in the use of memory capacity, since DP processing is required in addition to Markov model processing.

The second method does not use the correspondence to the time axis, but prepares the adapted code book by clustering the learning speech with reference to one original code book. Such method is described in:

(3) "Speaker adaptation method without a teacher based upon clustering of spectrum space". (*Japanese Acoustic Institute, Proceeding of Spring National Meeting of Showa* 63, 2-2-16, by Sadaoki Furui, March 1988).

(4) "Speaker Adaptation Method for HMM-Based Speech Recognition", (*Proceedings of ICASSP'88*, S5-7, by M. Nishimura and K. Sugawara, April 1988).

These methods require a large amount of calculations and memory capacity, and may not provide a highly accurate adaptation since all correspondences on the time axis are neglected.

In addition, the reference (4) discloses the adaptation of the Markov model parameters.

SUMMARY OF THE INVENTION

It is an object of the present invention to provide a speech recognition system capable of adaptation without difficulty even with drastic changes in the acoustic features, and capable of maintaining the correspondence between the labels.

According to the present invention, adaptation word speech is first subjected to frequency analysis for each predetermined time period to generate a train of feature vectors. Next, the feature vector train is divided into N ($N \geq 1$) segments on a time axis, and a word baseform obtained in advance for a certain speaker is likewise divided into N segments, preferably evenly divided. Next each segment of the feature vector train is aligned to each segment of the word baseform.

The baseform can be treated as a feature vector train by reference to a vector quantization code book, so that the difference between a representative feature vector (preferably the mean value) of each word speech segment and a representative feature vector of a corresponding baseform segment is determined on the basis of the correspondence therebetween. The difference is referred to as movement vector.

The intensity of correspondence between each label and each segment is on the other hand determined as a probability of producing that segment given the label. And then a code vector corresponding to each label is adapted by summing movement vectors each determined for the segments with those conditional probabilities used as weights, as described in Equation (1) below.

An outline of a series of operations according to the invention is shown in FIG. 1 with regard to an example where the number of adaptation word utterances is 1, the number of divided segments is 2, and the number of labels is 2. Here, $i(1 \leq i \leq W)$ is a word number, $j(1 \leq j \leq N)$ is the segment number, $S_{ij}$ is an average vector of the features of the adaptation speech for the word i and the segment j, $B_{ij}$ is an average feature vector estimated by the word baseform and the quantization code book, $F_k$ is a code vector corresponding to the label number k, $F_k'$ is a code vector after the adaptation, and $P(i,j|L_k)$ is the probability of producing the segment j of word i, given label $L_k$.

$$F_k' = F_k + \sum_{i=1}^{W} \sum_{j=1}^{N} P(i,j|L_k)(S_{ij} - B_{ij}) \quad [1]$$

Here, the probability $P(i,j|L_k)$ of producing each segment given a particular label $L_k$ is determined by first obtaining the probability $P(L_k|i,j)$ of producing that label given the segment of the word baseform, and then transforming based on Bayes theorem. Further as a producing frequency of a particular label in each segment, as described in Equation (2), a smoothed one can employed, that is a measured frequency of a particular label in each segment is smoothed by using label output probabilities of fenonic Markov models. Here $M_k$ is a fenonic Markov model, which corresponds to a label $L_k$ and $P(L_k|M_i)$ indicates a label output probability of the model $M_i$.

$$P(L_k|i,j) = \sum_{l} P(L_k|M_l)P(M_l|i,j) \quad [2]$$

DESCRIPTION OF THE PREFERRED EMBODIMENTS

Figure 1:
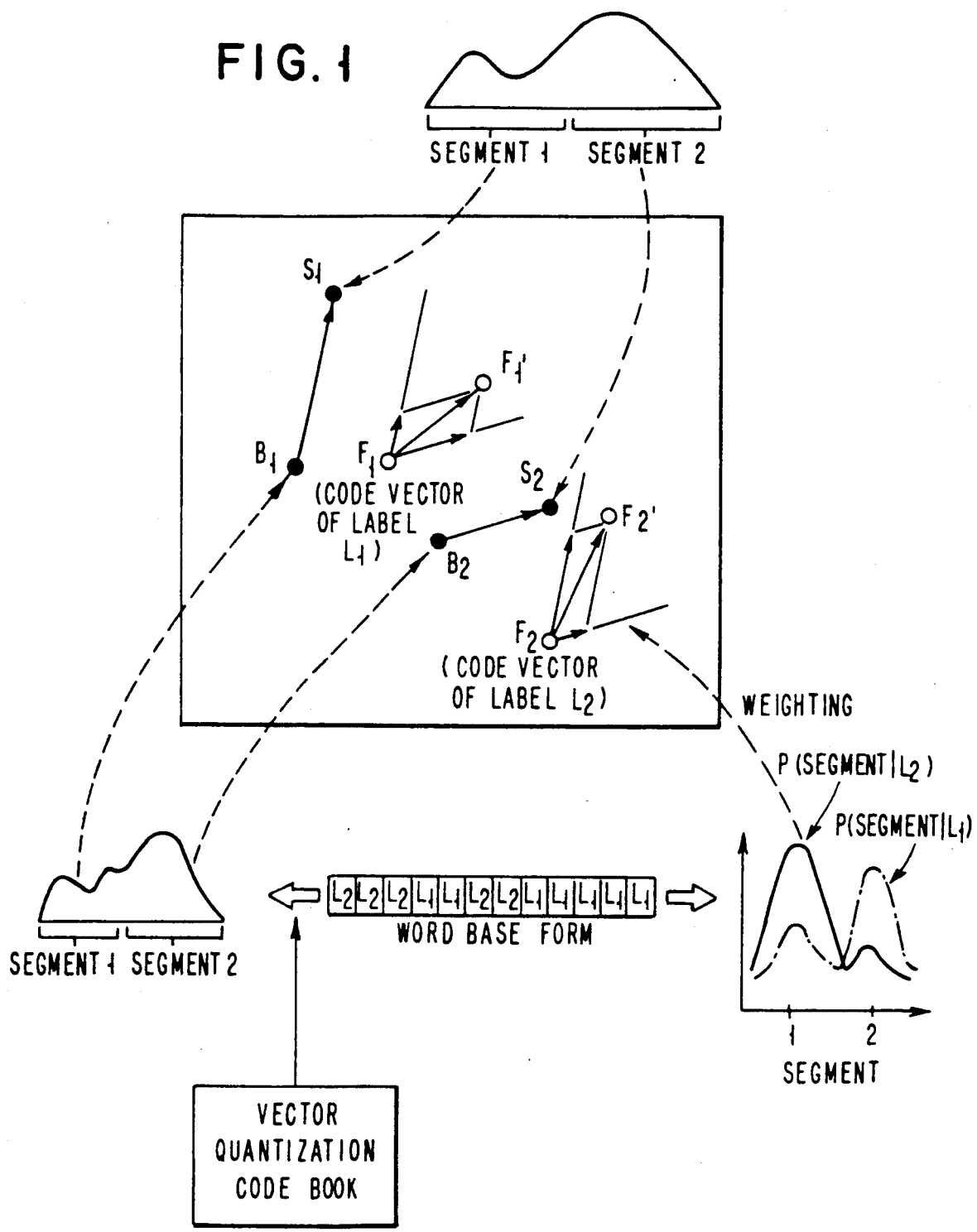
FIG. 1 schematically shows the adaptation method according to the invention.

The present invention will be described below with reference to the drawing for an embodiment where the present invention is applied to word speech recognition based upon fenonic Markov models.

Figure 2:
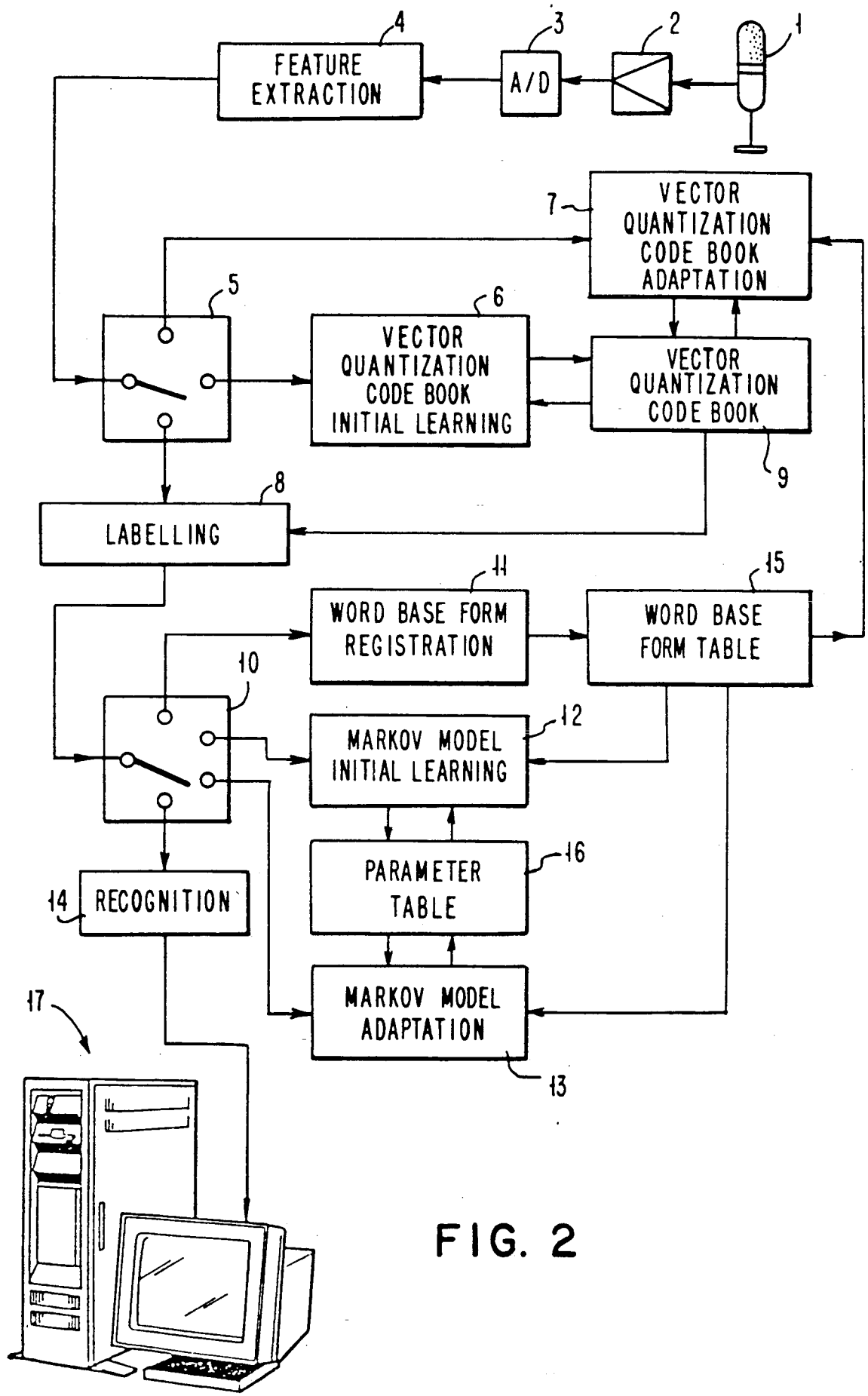
FIG. 2 is a block diagram of the present invention.

In FIG. 2, input speech is supplied to an analog-to-digital (A/D) converter 3 through a microphone 1 and an amplifier 2 and is converted into digital data therein. The digitized speech data is fed to a feature extraction device 4. In this feature extraction device 4, after discrete Fourier transformation, the speech data is extracted as the output of the critical band-pass filter of 20 channels reflecting the auditory sense characteristic. This output is supplied to a switching device 5 for each 8 msec and is sent to either a vector quantization code book initial learning device 6, a vector quantization code book adaptation device 7, or a labelling device 8. At the time of the initial learning of the vector quantization code book, the switching device 5 is connected to the code book initial learning device 6 to supply the output of the critical band-pass filter to the initial learning device 6. The initial learning device 6 prepares the vector quantization code book 9 comprising 128 code vectors by means of clustering.

For adaptation of the code book, the switching device 5 is connected to the adaptation device 7 where the vector quantization code book 9 at the time of the initial learning is used as the initial value and the adaptation of the code book is performed by referring a word baseform table 15, which will be explained below. The adaptation device 7 will also be described later with reference to FIG. 4.

For recognition, registration of the word baseform and initial training and adaptation of Markov models, the switching device 5 is connected to the labelling device 8 where the digitized speech data is labeled by referring to the vector quantization code book 9. Here, for initial training of Markov models the vector quantization code book at the time of initial learning is employed.

Figure 3:
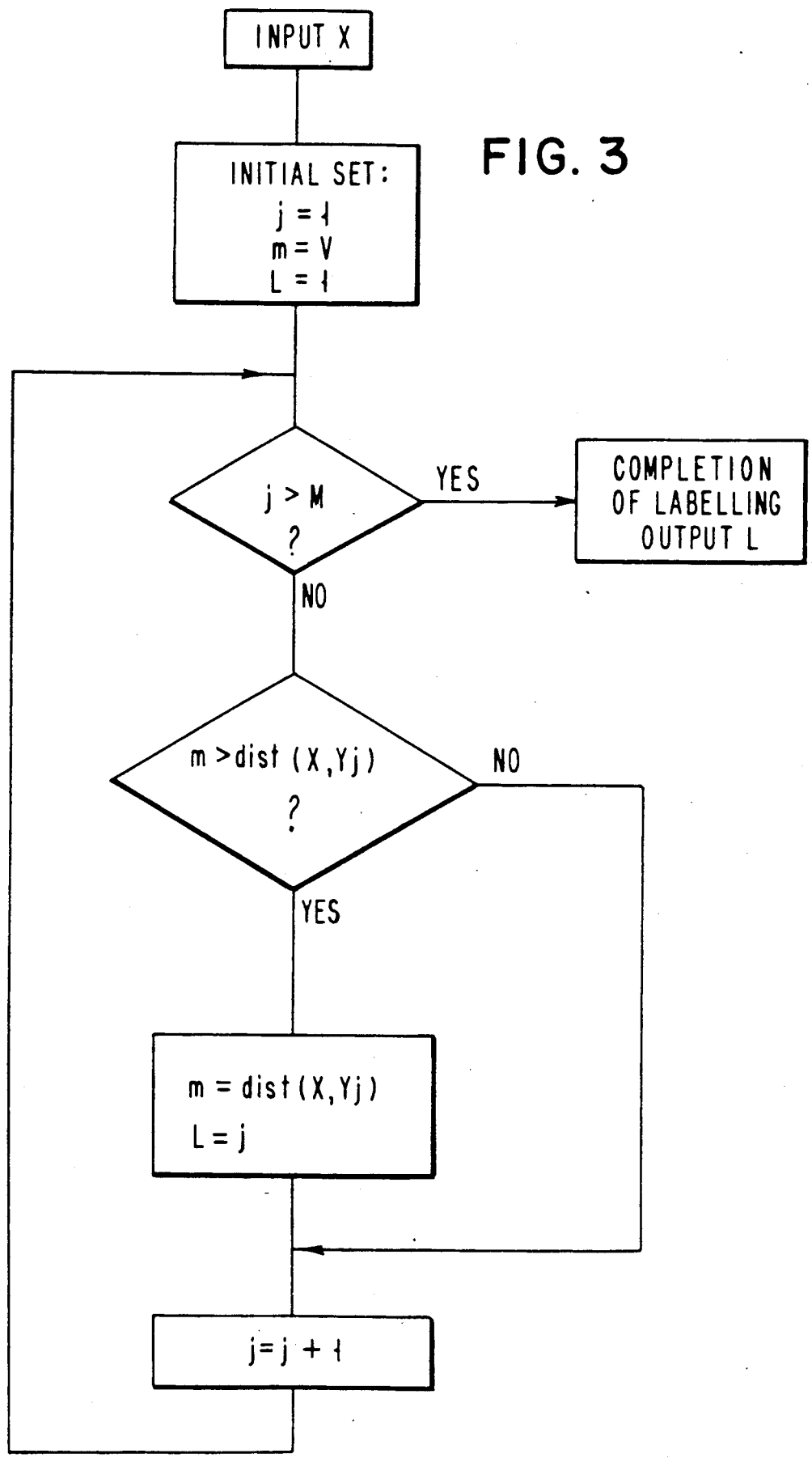
FIG. 3 is a flow chart showing the operation of labelling device 8 in FIG. 2.

The labelling is carried out, for example, as shown in FIG. 3. In FIG. 3, X designates an input feature vector of digitized speech data. $Y_j$ is the j-th label feature quantity (code or prototype vector). M is the number of code vectors (=128). The function "dist(X,$Y_j$)" is a Euclidian distance between X and $Y_j$, and m is the minimum value of "dist(X,$Y_j$)" up to each time point. The initial value of m is set equal to a large value V. As shown in the drawing, the input feature quantity X is successively compared with each of the code vectors, and the most similar (that is, the nearest one) is output as the observed label (label number) L.

Returning to FIG. 2, the label train from the labelling device 8 is supplied through the switching device 10 to a word baseform registration device 11, a Markov model initial learning device 12, a Markov model adaptation device 13, or a recognition device 14.

For word baseform registration, the switching device 10 is connected to the word baseform registration device 11 to provide the label train to the word baseform registration device 11. The word baseform registration device 11 prepares a word baseform table 15 from the label train.

For initial training of the Markov model, the switching device 10 is connected to the initial learning device 12 to provide the label train to the initial learning device 12. The initial learning device 12 trains the models by using the label train and the baseform table 15, and determines the parameter values of a parameter table 16.

For adaptation, the switching device 10 is connected to the adaptation device 13 where the parameter values of the parameter table 16 are adapted using the correspondence relationship between the input label train and each fenonic Markov model of the word baseform.

For recognition, the switching device 10 is connected to the recognition device 14 where the input speech is recognized based upon the input label train, the word baseforms and the parameter table.

The output of the recognition device 14 is fed to a workstation 17 and is displayed, for example, on a display device. In FIG. 2, all devices except for the microphone 1, the amplifier 2 and the display device 17 are provided on the workstation in the form of software. The IBM 5570 processing device, the Japanese DOS operating system, and the C programming language and macro assembler programming language were used to construct the recognition device. Alternatively, the recognition device may, of course, be implemented in the form of hardware.

Figure 4:
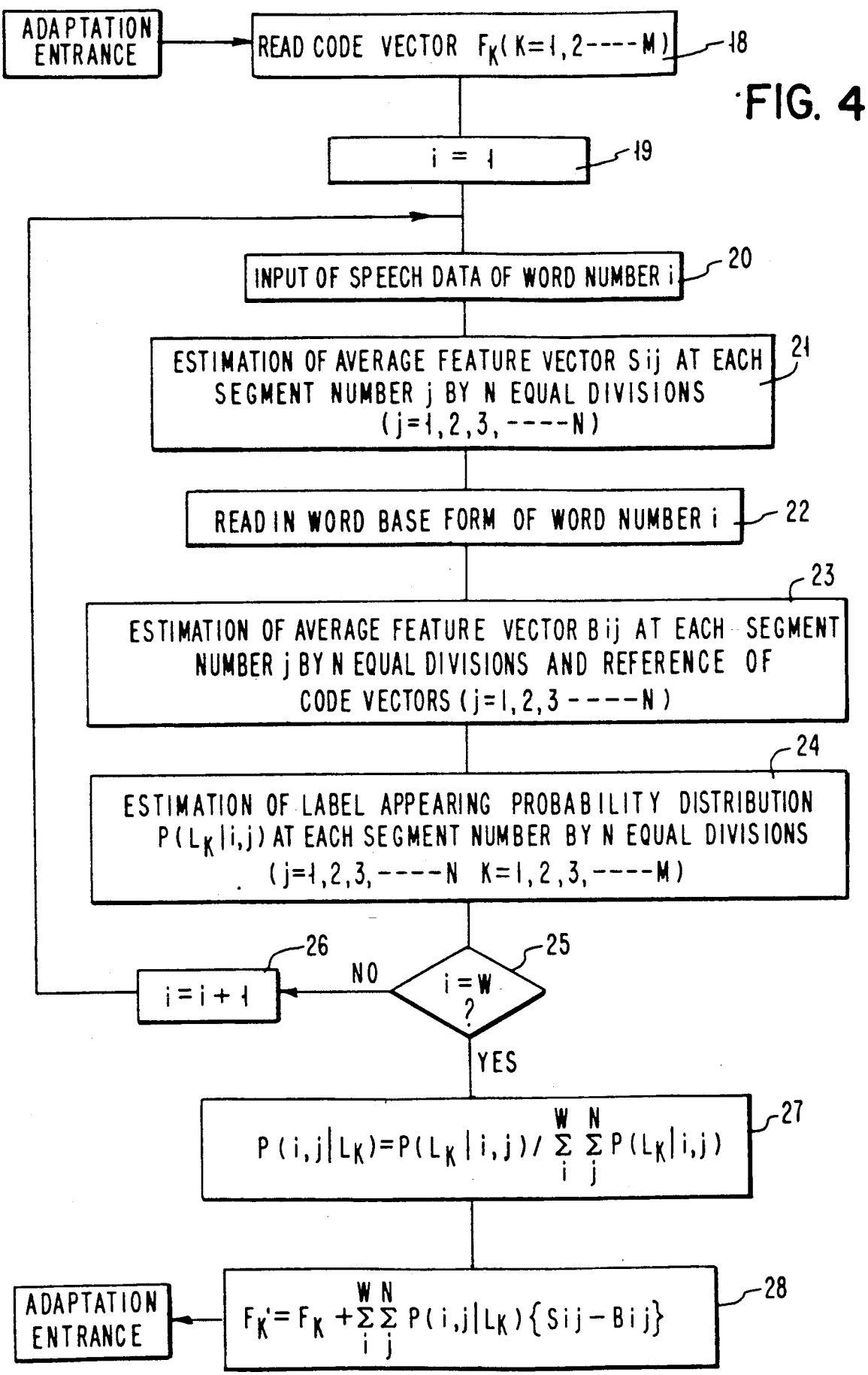
FIG. 4 is a flow chart showing the operation of vector quantization code book adaptation device 7 in FIG. 2.

Now, the operation of the vector quantization code book adaptation device 7 will be explained with reference to FIG. 4. In FIG. 4 representing the procedure of the code book adaptation, the code vector $F_k$ corresponding to each label $L_k$ is read out from the vector quantization code book (step 18). Then, the speech data of the adaptation learning word i is inputted (step 20). This speech data is equally divided into N segments on the time axis and the average feature vector $S_{ij}$ in each segment j is evaluated (step 21).

The baseform of the word number i is also read out for the word baseform (step 22). This word baseform is also equally divided into a quantity of N segments on the time axis, and the average feature vector $B_{ij}$ in each segment j is estimated by referring to the read out code vector in step 18 (step 23).

The probability $P(L_k|i,j)$ of the label $L_k$ in each segment j of word i is also estimated from the quantity of N equally-divided word baseforms (step 24). After performing the operations of steps 20-24 for all of the adaptation learning vocabulary, $P(L_k|i,j)$ is converted to the probability $P(i,j|L_k)$ of the segment j of the word i, given the label $L_k$ (step 27). Then, in accordance with Equation (1) all code vectors $F_k$ are adapted and the existing vector quantization code book is replaced with the adapted code vectors (step 28).

Figure 5B:
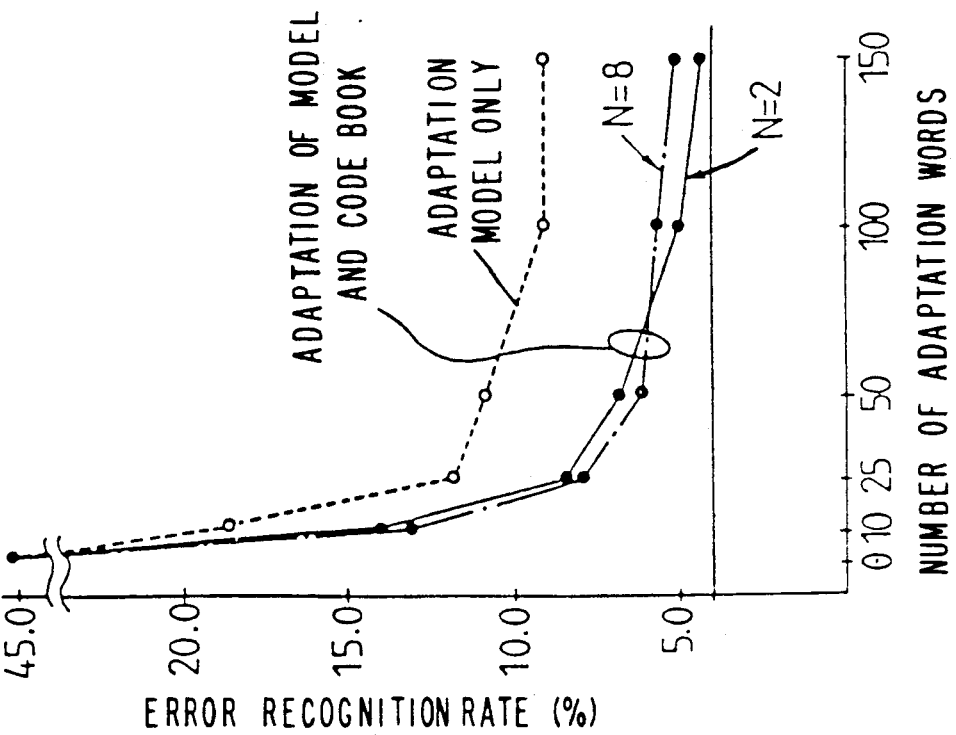
FIGS. 5A and 5B show recognition results under different conditions of adaptation.

Finally, evaluation experiments were carried out for this embodiment using 150 highly similar words such as "Keihoh, Heihoh, Chokusen, Chokuzen" as the vocabulary to be recognized. In these experiments, the initial learning speech data for the vector quantization code book and Markov models of the 150 words was uttered by one male speaker ten times. The vector quantization code book was adapted for seven male speakers (FIG. 5A) and four females speakers (FIG. 5B). The adaptation was carried out in different experiments with 10, 25, 50, 100 and 150 words (with one utterance of each word) of the objective vocabulary. The recognition experiment was carried out using 150 words uttered by each speaker three times.

Figure 5A:
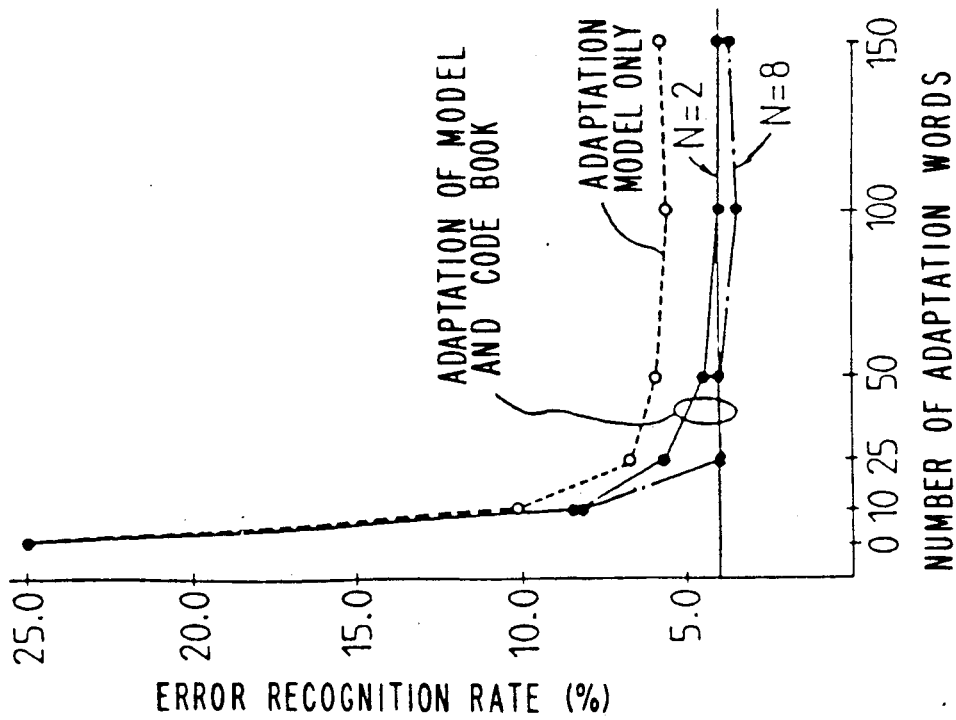

FIGS. 5A and 5B show recognition experimental results in which the horizontal axes designate the number of adaptation words, and the vertical axes designate the average error recognition rate. White circles show the results where only the Markov model is adapted, while black circles show the results where the present invention was applied together with the adaptation of Markov models. The solid line at 4% is a recognition experimental result for the speaker who initially trained the system.

From FIGS. 5A and 5B, it is shown that according to the present invention the same recognition accuracy as that obtained for the speaker who initially trained the system may be obtained for the male speakers by adaptation based on uttering 25 words once each. It is also clear that the present invention gives almost the same accuracy as that obtained for the speaker who initially trained the system (even with the adaptation of only the Markov model between the male and female causing an approximate 10% error due to the drastic changes of the feature quantity) with adaptation based on uttering 150 words.

I claim:

1. A speech recognition system performing a frequency analysis of an input speech for each period to obtain feature vectors, producing the corresponding label train using a vector quantization code book, matching a plurality of word baseforms expressed by a train of Markov models each corresponding to labels, with said label train, and recognizing the input speech on the basis of the matching result, and comprising:

a means for dividing each of a plurality of word input speeches into N segments (N is an integer number more than 1) and producing a representative value of the feature vector of each segment of each of said word input speeches;

a means for dividing word baseforms each corresponding to said word input speeches and producing a representative value of each segment feature vector of each word baseform on the basis of prototype vectors of said vector quantization code book;

a means for producing displacement vectors indicating the displacements between the representative values of the segments of the word input speeches and the representative values of the corresponding segments of the corresponding word baseforms;

a means for storing the degree of relation between each segment of said each word input speech and each label in a label group of the vector quantization code book; and a prototype adaptation means for correcting a prototype vector of each label of said vector quantization code book by said each displacement vector in accordance with the degree of relation between the label and the segment.

2. A speech recognition system according to claim 1, wherein the representative value of each segment feature vector of said each word input speech is an average value of the feature vectors in the segment.

3. A speech recognition system according to claim 2, wherein the representative value of each segment feature vector of said each word baseform is an average value of the prototype vectors of the labels in the segment.

4. A speech recognition system according to claim 3, wherein the degree of relation between each segment of said each word input speech and each label in the label group of the vector quantization code book is proportional to the probability $$P(L_k|i,j) = \sum_l P(L_k|M_l)P(M_l|i,j)$$

where $P(L_k|i,j)$ is the degree of relation between the segment j of the word input speech for the word i and the label $L_k$ in the vector quantization code book, $P(L_k|M_l)$ is the output probability of the label $L_k$ in Markov model $M_l$, and $P(M_l|i,j)$ is the probability of occurrence of Markov model $M_l$ given the observation of the segment j of the word i.

5. A speech recognition system according to claim 4, wherein in said prototype adaptation means each label prototype vector in the label group of said vector quantization code book is given by $$F_k' = F_k + \sum_i \sum_j P(i,j|L_k)(S_{ij} - B_{ij})$$

where $F_k$ is a prototype vector for label $L_k$ before correction, $F_k'$ is a prototype vector for the label $L_k$ after correction, $S_{ij}$ is a representative value of the feature vector in the segment j of the word input speech for the word i, and $B_{ij}$ is representative vector in the segment j of the word baseform for the word i.

6. A speech recognition system performing a frequency analysis of an input speech for each period to obtain feature vectors, producing the corresponding label train using a vector quantization code book, matching a plurality of word baseforms expressed by a train of Markov models each corresponding to labels, with said label train and recognizing the input speech on the basis of the matching result, comprising:

a means for producing a representative value of feature vectors in each of a plurality of word input speeches;

a means for producing a representative value of feature vectors in the word baseform corresponding to said word input speech, based upon prototype vectors of said vector quantization code book;

a means for producing a displacement vector indicating the displacement between the representative value of each word input speech and the representative value of the corresponding word baseform;

a means for storing the degree of relation between said each word input speech and each label in the vector quantization code book; and a prototype adaptation means for correcting a prototype vector of each label in the label group of said vector quantization code book by said each displacement vector in accordance with the degree of relation between the label and the word input speech.

7. A speaker-adaptable speech recognition apparatus comprising:

means for measuring the value of at least one feature of an utterance, said utterance occurring over a series of successive time intervals of equal duration, said means measuring the feature value of the utterance during each time interval to produce a series of feature vector signals representing the feature values;

means for storing a finite set of prototype vector signals, each prototype vector signal having at least one parameter having a prior value;

means for comparing the feature value of each feature vector signal, in the series of feature vector signals produced by the measuring means as a result of the utterance, to the prior parameter values of the prototype vector signals to determine, for each feature vector signal, the closest associated prototype vector signal, to produce an utterance-based series of prototype vector signals;

means for generating a correlation signal having a value proportional to the correlation between the utterance-based series of prototype vector signals and a first prototype signal;

means for modeling the utterance with a model-based series of prototype vector signals;

means for calculating a displacement vector signal having a value representing the distance between the series of feature vector signals and the series of model-based prototype vector signals; and means for providing the first prototype signal with a posterior parameter value equal to its prior parameter value plus an offset proportional to the product of the value of the displacement vector signal multiplied by the value of the correlation signal.

8. An apparatus as claimed in claim 7, characterized in that the displacement vector signal has a value representing the distance between an average of the series of feature vector signals and an average of the series of model-based prototype vector signals.

9. An apparatus as claimed in claim 8, characterized in that the correlation signal has a value proportional to the probability of observing the utterance-based series of prototype vector signals, given the occurrence of an utterance having feature values closest to the first prototype signal.

* * * * *